No. 613,989. Patented Nov. 8, 1898.
W. W. GREEN.
COUPLING FOR HARNESS STRAPS.
(Application filed May 26, 1897.)
(No Model.)

Witnesses
C. N. Walker
Victor J. Evans

Inventor
Willard W. Green.
By John Wedderburn.
Attorney

UNITED STATES PATENT OFFICE.

WILLARD W. GREEN, OF ASHLAND, VIRGINIA.

COUPLING FOR HARNESS-STRAPS.

SPECIFICATION forming part of Letters Patent No. 613,989, dated November 8, 1898.

Application filed May 26, 1897. Serial No. 638,293. (No model.)

*To all whom it may concern:*

Be it known that I, WILLARD W. GREEN, of Ashland, in the county of Hanover and State of Virginia, have invented certain new and useful Improvements in Couplings; and I do hereby declare the following to be a full, clear, and exact description of the invention, such as will enable others skilled in the art to which it appertains to make and use the same.

This invention relates to improvements in couplings for harness and for other purposes, and has for its object to provide a device of simple mechanism and which while operated with great facility does not permit of easy accidental loosening. It is especially adaptable for the purpose of connecting two portions in the martingale together, so that said portions may be detached from each other, leaving one portion attached to the bridle-reins and the other to the surcingle, and it is equally useful in a variety of other forms, especially as a checkrein-holder.

Figure 1:
Figure 2:
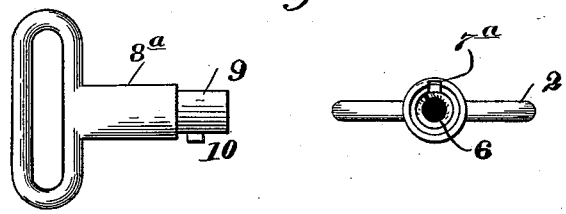
Figure 3:
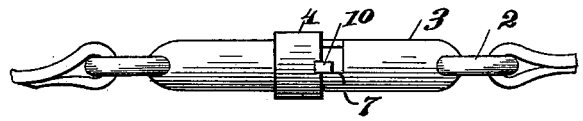
Figures 4, 5:
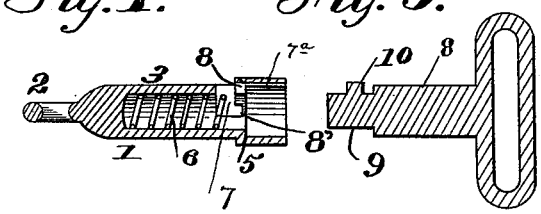

In the drawings herewith, Figure 1 is a front elevation showing the two portions of the couplings separated from each other. Fig. 2 is a plan view of the same, one of the portions being in horizontal position, so as to show the method of attachment between the two. Fig. 3 is a front elevation showing the two portions of the device attached to the abutting ends of the straps designed to be coupled to each other. Figs. 4 and 5 are longitudinal sectional views of each portion of my device, showing in slightly-magnified proportions their interior and exterior construction.

In the practice of my invention I provide first a portion 1, being in the form of a key having upon one end a flat slotted part adapted to receive the end of a strap 2. From the last-mentioned portion is projected at right angles therewith a hollow cylindrical portion 3, constituting the female member of the coupling. The extreme free end of this member is of slightly-enlarged diameter 4, terminating in an interior shoulder 5 and having deposited in the inner hollow portion, resting next against such shoulder, a spiral spring 6. Adjacent to but in the rear of the enlarged end portion 4 and extending throughout approximately one-half of the periphery of this member I provide a transverse slot 7, opening into the hollow portion, having at each end of said slot a shallow slot 8 and pocket 8', respectively, through and in the interior annular shoulder of the enlarged portion 4. Formed in the inner surface of the enlarged portion 4 is a longitudinal groove $7^a$, which communicates with the shallow slot 8.

The male member of my improved coupling consists of a portion similar in form, solid instead of tubular, having the same flattened portion and slot for the attachment of a strap, and a cylindrical portion $8^a$, extended at right angles therefrom, the same being reduced in diameter, as shown at 9, adjacent to the end thereof. Mounted centrally upon the periphery of the reduced portion is provided a stud 10, which is in parallel alinement with the projected flattened end 2 and projects beyond the surface of the enlarged portion $8^a$. The reduced portion 9 is adapted to enter and fit closely within the inner chamber of the portion 1, and the portion $8^a$ of the male member beyond the reduced diameter thereof is adapted to register closely with the enlarged tubular portion 3. In inserting the male member into and removing the same from the female portion the stud 10 passes through the groove $7^a$ in the inner surface of the enlarged portion 4.

The operation of my device is as follows: When it is desired to couple the two members, the reduced portion 9 is inserted into the enlarged portion 4 with the stud 10 fitting within the groove $7^a$ therein. The end of the reduced portion 9 abuts against the end of the spring 6 and further inward pressure will be resisted by said spring. As this pressure is applied, however, the stud 10 passes through the groove $7^a$ into the shallow slot 8 and thence into the transverse slot 7. The two parts are then turned relatively one to the other until the stud 10 reaches the opposite end of the slot 7 opposite the pocket 8'. The pressure of the spring 6 forces the male portion $8^a$ outwardly and brings the stud 10 into engagement with the pocket 8'. When seated in this manner, it will be observed that outward strain upon the two parts of the coupling is resisted not only by the material of which the tubular portion 3 is made, but also by the enlarged portion 4, which is integral therewith. The said enlarged portion serves to reinforce the device. By reason of the fact that the stud is seated within the pocket 8', which is formed in the tubular portion 3 and in the enlarged portion 4, lateral strain upon the two parts will be resisted by material of greater thickness than if the pocket 8' were formed in the cylindrical portion 3 alone. Furthermore, by forming the slot 7 in the cylindrical portion 3 at the rear of the enlarged portion 4 ready access can be had to said slot for the purpose of removing any accumulation of dirt which would otherwise affect the operativeness of the device.

The operation of my device is as follows: The two members can be brought into conjunction only in one position—that is, when the stud 10 is in engagement with the slot 8. The male member is then rotated until the stud 10 is carried through the slot 7 and falls into the pocket 8', and the two parts become in a locked position, not to be released therefrom until the parts are pressed together and turned simultaneously, the function of the spiral spring 6 being to press outwardly the intruding end of the male member and thus cause it to be firmly held or depressed in the pocket 8'.

Having thus described the invention, what is claimed as new is—

A harness-coupling comprising a tubular member having an enlarged tubular portion with a longitudinal groove in its inner surface, and a peripheral slot adjacent to the inner end of said enlarged portion, one end of which slot terminates in a pocket, and the other communicates with said groove, a solid cylindrical member having a reduced end portion provided with a radial stud which projects beyond the surface of the enlarged portion thereof, and a spring within the tubular member, as and for the purpose set forth.

In testimony whereof I have signed this specification in the presence of two subscribing witnesses.

WILLARD W. GREEN.

Witnesses:
W. M. HENRY,
J. RYLAND FLEET.